United States Patent

Badcock

[15] 3,687,372
[45] Aug. 29, 1972

[54] APPARATUS FOR IRRIGATING LAND

[72] Inventor: Neville Peter Badcock, Private Bag 68, Latrobe, 7307, Lornebrook, Australia

[22] Filed: June 17, 1971

[21] Appl. No.: 153,996

[52] U.S. Cl. ................239/183, 239/177, 239/189, 239/191
[51] Int. Cl. ...........................................B05b 3/00
[58] Field of Search......239/177, 183, 188, 189, 190, 239/191, 213, 196

[56] References Cited

UNITED STATES PATENTS

| | | | |
|---|---|---|---|
| 2,097,452 | 11/1937 | Dearborn | 239/177 |
| 3,477,643 | 11/1969 | Bruninga | 239/191 X |
| 3,519,206 | 7/1970 | Leaders | 239/191 X |

*Primary Examiner*—M. Henson Wood, Jr.
*Assistant Examiner*—John J. Love
*Attorney*—Cushman, Darby & Cushman

[57] ABSTRACT

The invention provides irrigating apparatus comprising a self-propelled wheeled carriage which is connected to a fixed hydrant by a hose through which water is supplied to spray means, on the carriage, which is also provided with a turntable or reel for winding and unwinding the hose.

The carriage is adapted to travel outwards from the hydrant in a substantially radial path during which the hose is paid out and laid on the ground behind it. Means are provided for reversing the carriage as it is moving outwards whereby it then returns to the hydrant along the line of the hose which is progressively rewound on the carriage. Reversal of the carriage as it travels outwards is effected either by its contact with an obstacle in its path or by the operation of means on the carriage which sense its distance from the hydrant.

When the carriage returns to and engages the hydrant, it is angularly displaced, after which its motion is again reversed so that it moves outwardly again in a travel path which is angularly displaced from its previous path. These operations may be repeated until the entire area surrounding the hydrant is irrigated and may continue indefinitely until the water is turned off.

The extent of the angular displacement of the carriage, when it returns to the hydrant, may be determined by associated escapement means, or otherwise, and such angular displacements are not necessarily uniform but may depend on the shape of the area to be watered.

Provision is made for progressively reducing the speed of the carriage as it moves outwardly and or inwardly so that the ground is uniformly watered.

The carriage is driven inwardly and outwardly by a suitable motor thereon. A hydraulic motor is preferably used for this purpose in which case the discharge from the motor is directed to said spray means.

The carriage preferably has a horizontal turntable for winding and unwinding the hose, two laterally spaced driven transport wheels to which motion is transmitted through reversing and differential gearing, and an elongated substantially counterbalanced inward extension. This extension is provided with hose guide means and with means engageable with the hydrant to cause the carriage to be angularly displaced and to effect operation of the reversing mechanism. The center of gravity of the carriage is preferably disposed at a low level and between the said transport wheels.

19 Claims, 20 Drawing Figures

Patented Aug. 29, 1972

INVENTOR
NEVILLE PETER BADCOCK

BY Cushman, Darby & Cushman
ATTORNEYS

INVENTOR
NEVILLE PETER BADCOCK

BY Cushman, Darby & Cushman
ATTORNEYS

INVENTOR
NEVILLE PETER BADCOCK
BY Cushman, Darby & Cushman
ATTORNEYS

APPARATUS FOR IRRIGATING LAND

This invention relates to the apparatus for the spray irrigation of land and particularly pastures, sports grounds and the like but is not limited thereto.

Various types of apparatus for the automatic spray irrigation of land have previously been proposed and used, but such known apparatus is, in general, subject to disadvantage of one kind or another. Thus, most devices of this kind are suitable only for the irrigation of circular areas and or are apt to be stalled by obstacles in their path of movement.

It is therefore the general object of this invention to provide apparatus suitable for the spray irrigation of relatively large areas and which provide advantages over known systems and apparatus.

Accordingly, the invention provides irrigating apparatus comprising a carriage adapted to be driven outwardly over the ground in a substantially radial path from a fixed hydrant and then to return thereto along substantially the same path, said carriage comprising a frame, at least one driven transport wheel, a driving motor therefor, spray means arranged to discharge, onto the ground, water supplied thereto from the hydrant through a flexible hose, rotary winding and unwinding means from which the hose is progressively paid out and laid on the ground as the carriage moves outwardly, and which progressively rewinds the hose as the carriage moves inwardly, means operable to reverse the direction of movement of the carriage, means operable, as the carriage is moving outwardly to actuate said reversing means whereby the carriage is caused to return inwardly, means engageable with the hydrant when the carriage returns thereto thereby to cause the carriage to be displaced angularly about the hydrant, and means subsequently operable to again actuate said reversing means whereby the carriage commences a further outward movement in a different travel path.

The angular displacement imparted to the carriage adjacent to the hydrant would, in many cases, be comparatively small though it may be as much as 180° or even more according to requirements. Thus, for example, if the hydrant is arranged at the center of a long narrow area, it may be indexed through 180° each time it returns to the hydrant.

The said means for effecting reversal of the carriage as it moves outwardly may be operable by the engagement of the carriage with an obstacle in its path and or by the operation of sensing means responsive to the distance of the carriage from the hydrant and such sensing means may be adapted to operate at different predetermined distances from the hydrant according to the particular radial path in which the carriage is moving.

Thus, the apparatus may be adapted to irrigate areas of circular, rectangular or various other regular or irregular shapes.

The said means operable to re-orient the carriage may comprise an intermittently angularly movable abutment arm which turns about a vertical axis disposed at or near the hydrant, said arm being arranged to be engaged and moved by the inner end portion of the carriage as the latter is completing each inward movement, escapement means operable to determine the angular movement thus imparted to the arm, and means for imparting a corresponding angular movement to the carriage.

For this purpose, the carriage may be provided with at least one non-steerable driven transport wheel which has its axis disposed approximately radially with respect to the hydrant when the carriage returns thereto and engages and displaces the said abutment arm, whereby during such displacement the carriage turns about the hydrant until it is aligned with the path of its next succeeding outward movement.

Alternatively and preferably, the carriage is provided with at least one steerable driven transport wheel which is normally maintained in a position such that the carriage may be driven outwardly and inwardly in a substantially radial path, and the carriage is provided with steering means operable when the carriage returns to the hydrant whereby the carriage is driven angularly into alignment with its next succeeding path of movement.

This angular displacement of the carriage may be determined by the movement of a pivoted abutment arm and associated escapement means, or by the progressive displacement of a relatively movable member on the inner end portion of the carriage when it engages an abutment on or adjacent the hydrant.

The said carriage preferably has a laterally spaced pair of transport wheels which are driven through differential gearing and the carriage is preferably so constructed that its center of gravity is close to the ground and to its longitudinal centerline to reduce the tendency to move sidewise out of its radial path on undulating ground.

For this purpose, the said rotatable hose reel is preferably in the form of a horizontal turntable on which the hose is preferably wound as a single layer spiral coil.

The carriage preferably includes an elongated inward extension, the free end of which is supported by a skid or wheel and provided with means which maintain the hose under some tension as it is laid on the ground. The free end of this extension also supports means adapted to co-act with the aforesaid intermittently movable abutment arm or other abutment means adjacent to the hydrant. This extension, the hose tensioning means thereon, and the aforesaid differential gearing employed to transmit the drive when the carriage is supported on laterally spaced transport wheels, play important roles in navigating the carriage along a substantially straight path as it moves outwardly from the hydrant.

The said driving motor is preferably a hydraulic motor though any other suitable driving motor may be used, e.g., an internal combustion engine or electric motor, and means are also preferably provided for progressively reducing the speed of the carriage as it moves outwardly from the hydrant and for progressively increasing the speed thereof as it returns towards the hydrant so that each unit area of the ground will receive approximately the same amount of water. Alternatively, means may be provided for regulating the discharge of water to produce the same result or again both the speed of movement of the carriage and the rate of discharge of the water may be automatically regulated.

If desired, the apparatus may be constructed so that the carriage is driven relatively quickly outwards while its return movement commences slowly and progressively increases as it approaches the hydrant. This mode of operation is advantageous when the nature of the ground is such that the carriage would be liable to become bogged during the return movement if heavy watering takes place during outward travel.

While in order to avoid wastage of water, such variable speed means are important when the apparatus is used for the irrigation of large areas of pasture or the like, they may if desired, be omitted from apparatus intended only for the watering of relatively small areas such as some playing fields.

The invention also includes the combination of the said carriage with the fixed hydrant and associated means to co-act with the carriage.

In order, however, that the invention may be more clearly understood, representative forms of irrigating apparatus in accordance therewith are hereinafter more fully described with reference to the accompanying drawings in which.

BRIEF DESCRIPTION OF APPARATUS AND ITS OPERATION

Figure 1:
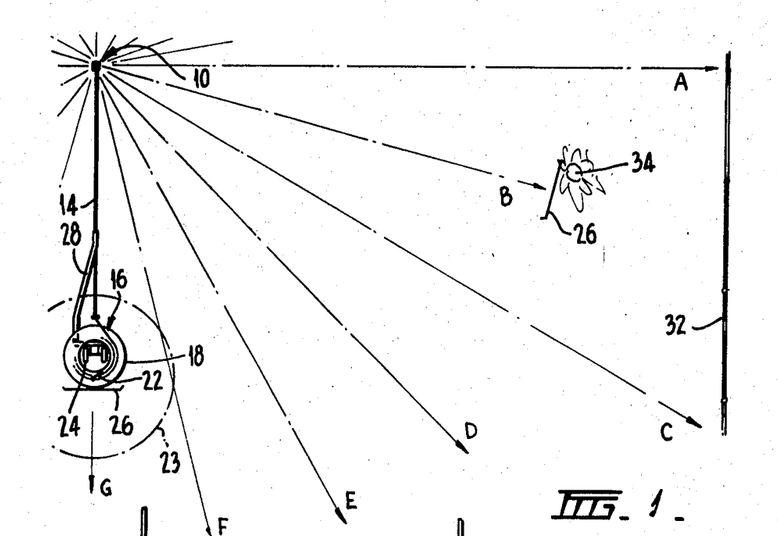
FIG. 1 is a diagrammatic plan view illustrating the operation of the apparatus.
Figure 2A:
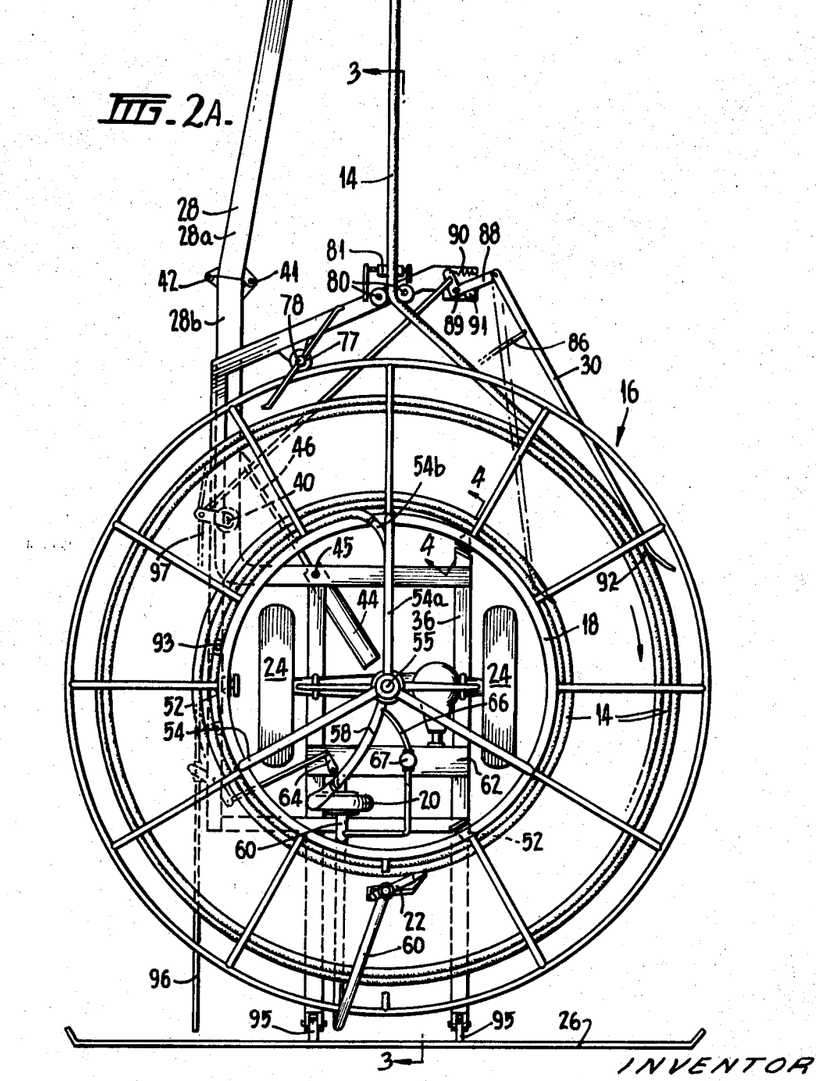
FIGS. 2A & 2B together constitute a plan view of the hose carriage included in the apparatus.
Figures 2B, 8:
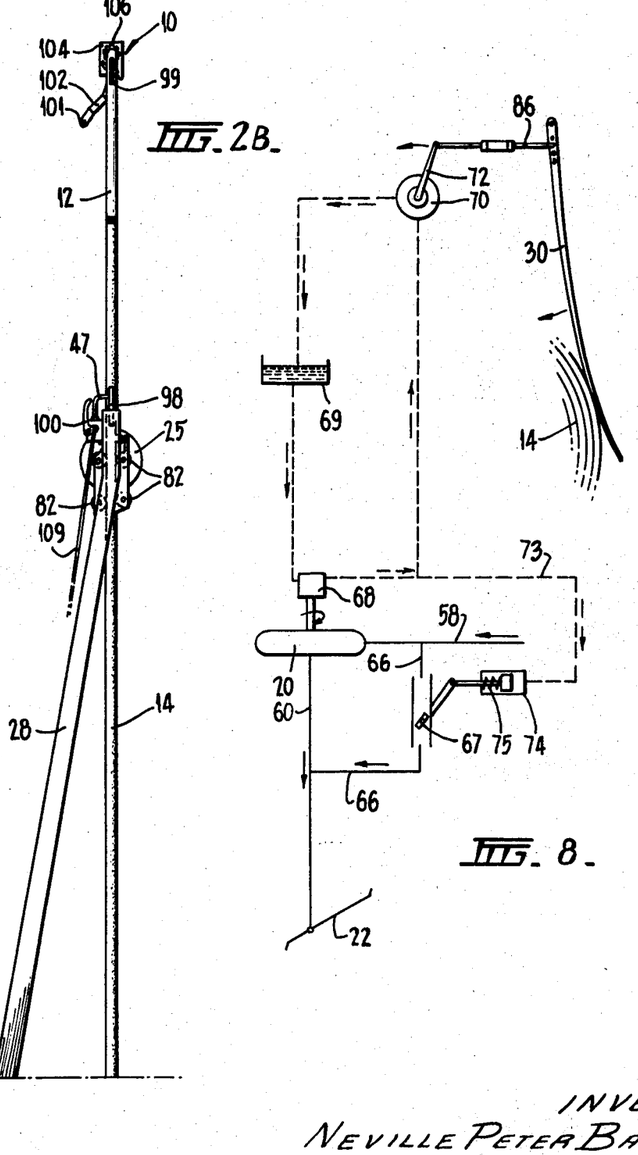
FIG. 8 is a diagram of variable speed control means for the carriage.
Figure 3:
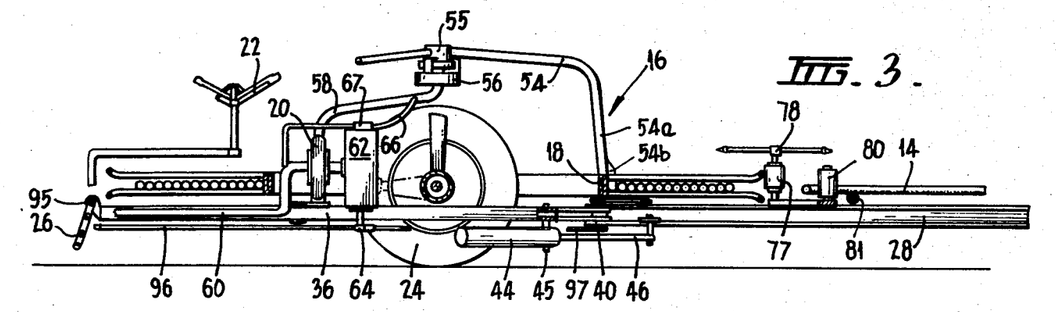
FIG. 3 is a view in vertical section taken on the line 3—3 of FIG. 2A.
Figure 4:
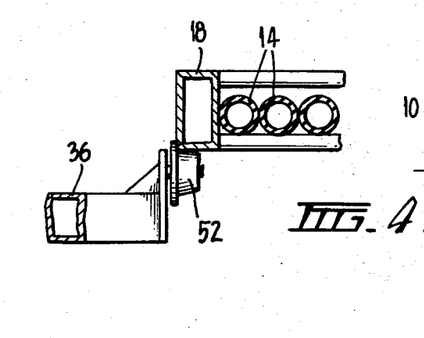
FIG. 4 is a detail view in sectional elevation taken on line 4—4 of FIG. 2A and shows a supporting roller for the turntable.
Figure 5:
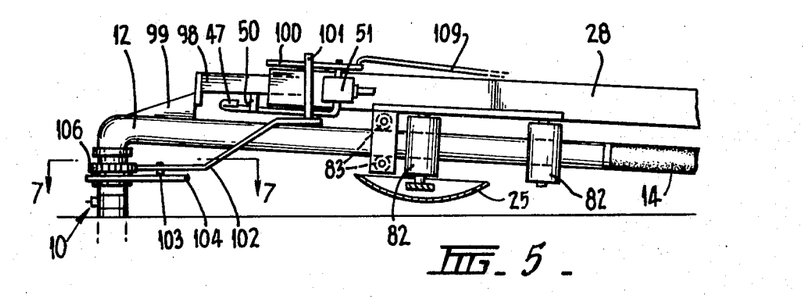
FIG. 5 is a view in side elevation of a hydrant and the co-acting inner end portion of the carriage.
Figure 6:
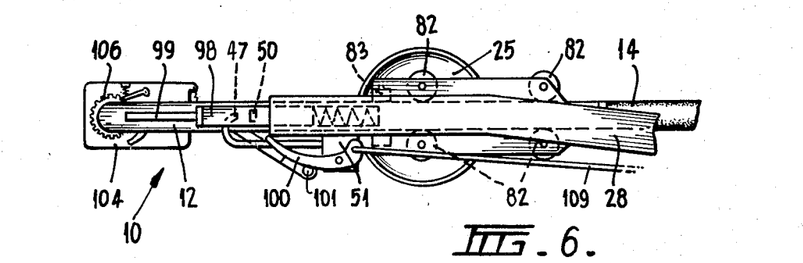
FIG. 6 is a plan view of the apparatus shown in FIG. 5.

Referring initially particularly to FIG. 1 but also to FIGS. 2A and 2B, the reference numeral 10 designates a vertical hydrant arranged in a fixed position and generally, though not necessarily, at or near the center of a field which may be rectangular or circular or of various other regular or irregular shapes.

A tubular discharge arm 12 is swivelly mounted on a hydrant and its free end is connected by a flexible hose 14 to a self-propelled wheeled carriage, generally designated 16. The outer end portion of the hose is wound, in the form of a single layer spiral coil, on a horizontal annular turntable 18 which is rotatively mounted on the carriage. This hose may be as much as 500 feet or more in length or its length may be substantially less according to requirements.

Some or all of the water supplied through the hose is directed to a hydraulic motor 20 of any suitable type mounted on the carriage and the water is finally sprayed onto the ground through at least one spray nozzle 22 mounted on the carriage, The area covered by the spray being indicated by the circle 23.

The carriage is supported by a laterally opposed pair of wheels 24 which are driven by the motor through reversing and variable speed mechanism and an elongated inwardly extending pole 28 on the carriage has its free end supported by a skid 25 and is fitted with guide rollers 82 for the hose.

In operation, the carriage is driven outwardly from the hydrant in an approximately radial path during which the hose is paid out from the turntable and laid on the ground under a light tension. This outward movement continues until the carriage encounters an obstacle in its path or until it has reached a predetermined distance from the hydrant when, in either case, the reversing mechanism is automatically actuated so that the carriage commences to return along the same path towards the hydrant. During the return movement, the turntable progressively rewinds the hose.

For the purpose of actuating the reversing mechanism, the outer end portion of the carriage is fitted with a displaceable bumper bar 26, while additionally or alternatively, a spring loaded pivoted arm 30, FIG. 2A, which bears against the outermost convolution of the coil of hose on the turntable, is arranged to actuate the reversing mechanism when the diameter of the coil diminishes to a predetermined value corresponding to a required maximum distance of the carriage from the hydrant. This mechanism may be adjusted to suit either the size of the field or the length of the hose whichever is the lesser.

Thus, if while the carriage is moving outwardly, the bumper bar 26 is arrested by striking an obstacle in its path, the reversing gear is actuated and the carriage commences to return towards the hydrant. The obstacle may be a boundary fence 32, a tree 34 or any other solid object. However, if no obstacle is encountered, the outward movement may continue until substantially all or any predetermined length of the hose has been paid out at which stage the reversing mechanism is operated by the pivoted arm 30.

When the carriage is reversed, it continues to move inwardly until it reaches and engages the swivel outlet 12 on the hydrant, to cause the carriage to be driven angularly into the path of its next radial outward movement and then to commence a further outward movement in the new direction. The apparatus continues to operate in this manner until the water supply is turned off, the successive paths being indicated by the letters A, B, C – – – and the angle between successive paths may be varied as required. Also, the angle between successive paths may be such that during a second circuit of the field, its radial paths will be arranged between the radial paths of the preceding circuit.

Finally, the speed of the machine is progressively reduced by the aforesaid variable speed mechanism as the carriage moves outwardly and is similarly progressively increased as it moves inwardly in order that the entire area will be watered substantially uniformly.

CARRIAGE CONSTRUCTION

Referring now to FIGS. 2A to 6, the carriage 16 has a rigid main frame 36 which is secured to a housing for the axles and differential gearing for the transport wheels 24.

An elongated member 28, for convenience hereinafter termed a pole, extends inwardly from the frame towards the hydrant and its outer end is pivotally connected to the frame by a vertical pivot pin 40 arranged radially inwards of the extended axis of the transport wheels and at or near one side of the frame so as to be offset laterally with respect to both of the wheels 24.

The free inner end of the pole 28 is supported at the required height above the ground by the aforesaid skid 25 which preferably consists of a dished disc. As hereinafter explained, the carriage is substantially balanced about the axis of the wheels 24 so that the skid 25 rests only lightly on the ground.

As the pole is preferably of a length such that it would be inconvenient for road transport and storage, it preferably comprises pivotally connected inner and outer sections 28a and 28b respectively, which are pivotally connected at 41 but which are normally rigidly locked together by a pin 42.

When the locking pin is removed, the inner end section 28a may be swung outwardly about its pivotal connection 41 and if desired, its free end may then be secured to the main frame.

The outer end portion of the pole 28 is also connected to the adjacent portion of the frame 36 by an adjustable pivoted link which consists of a cylinder 44, conveniently termed the steering cylinder, which is pivoted to the frame by a vertical pivot pin 45, and a rod 46 which is pivoted to the pole and is connected to a piston in the cylinder. The opposite ends of the cylinder are connected by a restricted by-pass passage which may be formed in the piston and water supplied to the carriage through the hose 14 is continuously connected to the inner end of the cylinder while its outer end is connected by a pipe 47 to a normally closed dump valve 50 arranged near the free inner end of the pole.

As the water supplied to the inner end of the cylinder may pass through the restricted by-pass passage to its outer end, and as the effective area of the outer side of the piston is larger than that of its inner side to which the rod 46 is connected, the piston is normally maintained at the inner end of the cylinder so that the common axis of the transport wheels is at right angles to a radial line extending from the center of the carriage to the hydrant as shown in FIG. 2A.

As hereinafter explained, when the carriage is returning towards the hydrant and the free inner end of the pole engages it, the dump valve 50 is automatically opened so as to release the pressure on the outer side of the piston in the cylinder 44.

Figures 9, 10:
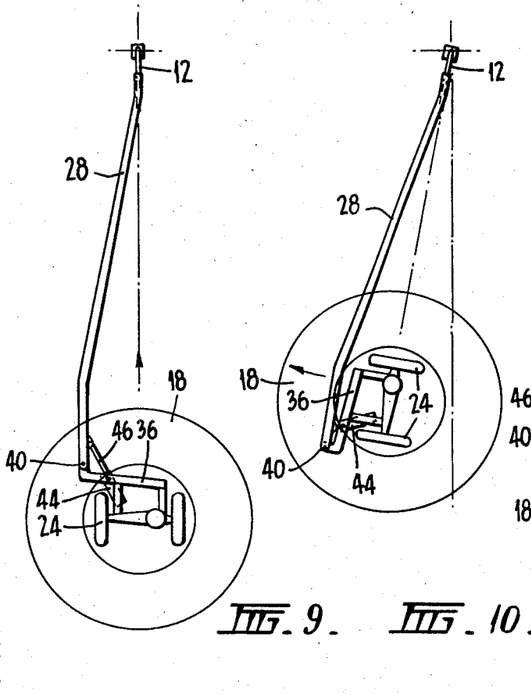
FIGS. 9, 10 & 11 are diagrammatic plan views showing successive stages in the reorientation and reversal of the carriage at the hydrant.
Figure 11:
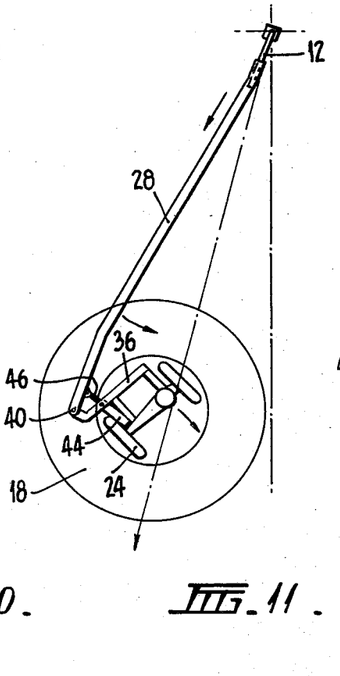

At this time, the carriage is still being driven inwardly so that due to the offset position of the pivotal connection 40 between the pole 28 and the carriage frame 36, the carriage is driven inwardly towards the pole and angularly about the hydrant as hereinafter more fully explained and as shown in FIG. 9.

When subsequently the dump valve 50 or another valve 51 in pipe 47 is closed, the outer end of the steering cylinder is refilled with water under pressure through the restricted by-pass in the piston. Thus, the carriage frame is returned to its normal position relatively to the pole at the commencement of a further outward movement in a different direction.

The annular turntable 18 is rotatively supported on top of the carriage frame 36 at approximately the height of the axis of the transport wheels and its inner diameter is such that it encloses the latter. The inner peripheral portion of the turntable may be supported on and located by a plurality of flanged rollers 52 mounted on the frame.

In order to ensure that the hose is wound on the turntable as a single layer spiral, the turntable has the form of a horizontally disposed reel with its upper side sufficiently close to the table to prevent a convolution from riding up on the preceding one.

A plurality of spaced rigid arms 54 extend upwardly and inwardly from the inner periphery of the turntable and are connected to a central vertical hub member 55 conveniently provided with a bearing flange which rests on a thrust bearing disc 56 rigidly secured to the frame 36. Any suitable means may be provided for normally retaining the said bearing flange to the fixed disc while permitting the turntable to rotate freely. Thus, the turntable is normally retained to the carriage.

The said hub member 55 is hollow and open at its lower end and one of the turntable arms, viz. the arm designated 54a, serves as a pipe for directing the water from the hose 14 to the interior of the hub member and for this purpose, the outer end portion of the arm 54a is provided with a branch 54b to which the adjacent end of the hose is coupled by a suitable union.

The water thus delivered to the hub member 55 passes downwardly through a rotary seal into the upper end of a pipe 58 which is secured rigidly to the frame 36.

The opposite end of the pipe 58 is connected to the inlet of a turbine 20 which is mounted on the frame 36 outwardly of the transport wheels and inside the annular turntable.

The discharge pipe 60 of the turbine extends outwardly below the turntable and is then bent upwardly beyond the latter and returned above it where its free end is fitted with a suitable spray nozzle 22. This nozzle is preferably of the known rotary "knocker" type which projects a radial jet of water which is automatically intermittently rotated about a vertical axis so as progressively to water a surrounding circular or part circular area, e.g., a semi-circular area, according to requirements.

The shaft of the turbine is coupled to the input spindle of a gear box 62 which houses conventional reduction and reversing gearing and also variable speed control mechanism while the output spindle of the gear box is coupled to the differential gearing for driving the transport wheels.

As shown in FIG. 2A, the turntable 18 is driven in the clockwise direction to rewind the hose as the carriage is returning towards the hydrant so that it rotates anticlockwise to pay out the hose as the carriage moves outwardly. For this purpose, the turntable may be driven in each direction by suitable transmission means from the gear box 62.

However, in the construction shown in the drawings, a springopressed friction drive wheel 77 constantly engages the outer periphery of the turntable and is constantly driven in the anti-clockwise direction by an auxiliary hydraulic motor in the form of a jet reaction spray device 78 supplied with water through a pipe connected to the turbine inlet pipe 58. The friction wheel thus constantly tends to drive the turntable in the clockwise or rewinding direction and at a speed which is at least equal to the maximum required rate.

When the carriage is being driven outwardly, the turntable is constrained by the hose to rotate in the anti-clockwise direction so that the spray device 78 is driven in the clockwise direction in opposition to the reaction forces of its jets, which thus maintain the hose under tension.

Similarly, when the carriage is being driven inwardly, the rate of rotation of the turntable is determined by the inward speed of the carriage, so that the hose is rewound under some tension.

The hose is led from the turntable between a laterally spaced pair of guide rollers 80 arranged on opposite sides of the radial centerline or travel path of the carriage and over a horizontal roller 81 from which it is paid out onto the ground, the said rollers being supported on an inward extension of the carriage frame and relatively close to the turntable. These rollers may turn freely or they may be driven in any convenient manner, for example by a rotary jet reaction spray device.

Two further pairs of laterally spaced guide rollers 82 are supported, the one pair outwardly of the other, on the pole 28 adjacent to its free inner end, and upper and lower horizontal rollers 83 are arranged above and below the hose adjacent to the innermost pair of rollers 82.

Thus, as the carriage is moving outwards, the hose is laid on the ground along the radial line of travel immediately behind the turntable and is then picked up so as to pass over the lower horizontal roller 83 and between the pairs of rollers 82 before being again deposited on the ground.

The carriage, including the pole 28, is approximately balanced about the axis of the transport wheels 24 so that its center of gravity is disposed in or close to the vertical transverse plane containing that axis, while also it is preferably approximately midway between the wheels and close to the ground.

Due to this disposition of the center of gravity and to the tension exerted by the hose at the free end of the pole, the carriage tends to move outwardly in a substantially straight radial path even when the ground is undulating.

VARIABLE SPEED MECHANISM AND REVERSE GEAR CONTROL MEANS

A by-pass pipe 66 connects the turbine inlet pipe 58 to the discharge pipe 60 and is provided at a suitable intermediate position with a balanced valve 67, e.g., a butterfly valve, by which the flow therethrough is controlled. Thus, the speed of the turbine may be controlled by allowing a greater or lesser proportion of the water to flow through the by-pass pipe to the discharge pipe 60 where it combines with the water leaving the turbine and passing to the spray nozzle 22.

Preferably, and as diagrammatically shown in FIG. 8, the by-pass valve 67 is automatically adjusted by a hydraulic control system which is conveniently housed within the gear box. This control system comprises a positive displacement pump, e.g., a gear pump 68, driven by the turbine and arranged to pump oil from a reservoir 69 through a conventional pressure-compensated constant flow control valve 70 and back to the reservoir, the setting of this valve being adjustable by a pivoted lever 72 to permit of different oil flow rates.

For any particular setting of this valve, there is a corresponding maximum speed of the turbine because the valve determines the maximum flow rate of the oil. Thus, if when the oil is being pumped at the maximum rate permitted by the valve, the speed of the turbine tends to increase, the back pressure of the oil rapidly increases.

For the present purpose, a branch 72 from the oil circuit is connected to one end of a cylinder 74 fitted with a piston coupled to the by-pass valve 67 which is urged towards its closed position by a spring 75.

Thus, as the pressure of the oil between the gear pump and the flow control valve 70 increases due to a tendency of the turbine to run beyond its permitted speed, the piston in the cylinder 74 is displaced in opposition to the spring 75 to cause the by-pass valve to permit a greater flow of water through the by-pass pipe and so correspondingly reduce the flow through the turbine.

A further advantage of this speed control mechanism is that it operates as a brake when the carriage is moving down an incline.

As previously mentioned, the carriage supports a spring-loaded pivoted arm 30 which constantly bears against the outer periphery of the hose coil on the turntable, so that its angular position at any time corresponds to the distance of the carriage from the hydrant and this arm is therefore utilized to regulate the setting of the control flow valve 70 in the variable speed control circuit. For this purpose, the pivoted arm 30 is connected by a link 86 to an arm associated with the valve 70. Thus, the turbine speed is progressively reduced as the carriage proceeds outwardly and vice versa.

The said hose engaging arm 30 is mounted on the free end of a short arm 88 which has its opposite end pivoted at 89 to a rearward extension of the carriage frame inwardly of the turntable.

This arm 88 has a limited angular movement but is normally maintained by a spring 90 at its innermost position relatively to the turntable, this position being determined by a stop 91.

The hose engaging arm 30 is provided adjacent to its free end with an inward projection 92 and the turntable is provided with an upstanding pin 93 which is adjustable radially on the turntable so that it may be arranged at the radial position which corresponds to any predetermined distance from the hydrant at which it is desired to reverse the drive to the carriage. This limiting distance may depend upon the length of the hose or the dimensions of the field to be irrigated.

Thus, as the carriage is moving outwardly paying out the hose and the hose coil engaging arm 30 is progressively moved inwards, the inward projection 92 on the free end of the latter eventually moves into the path of the co-acting pin 93 on the turntable. The pin then forces the arm 30 endwise so that its supporting arm 88 is displaced in opposition to its spring 90 and the displacement of the arm 88 is utilized to actuate the drive reversing mechanism as hereinafter explained.

The reversing mechanism is operated by means of a pivoted arm 64 on the gear box and when the carriage is travelling outwards, it is operable either by the displacement of the arm 88 in the manner just described, when the carriage has travelled a predetermined distance or by the aforesaid bumper bar 26 if it should strike a solid obstruction in its path.

The bumper bar is mounted on the free ends of a plurality of pivoted arms 95 which enable it to swing bodily towards and from the turntable and it is normally maintained in its outermost position by one or more springs.

When the bumper is pushed inwardly by an obstruction, it strikes and displaces the adjacent end of a push rod 96 which is arranged to actuate the reversing arm 64.

Similarly the pivoted arm 88, on which the hose engaging arm 30 is mounted, is connected to a link 97 which is arranged to operate the reversing arm 64 when the arm 88 is displaced endwise. This link 97 may be slotted at one end to enable arm 88 to return to its normal position without again moving the reversing arm.

Operation of the reversing arm from its outward drive position causes the carriage to commence its return movement to the hydrant which takes place at a progressively increasing speed as hereinbefore explained.

The carriage is guided back to the hydrant along the hose which is progressively picked up and rewound on the turntable and as the free end of the pole closely approaches the swivel outlet 20 on the hydrant, the hose guide rollers 82 and 83 thereon are guided onto the outlet by the hose and the upper roller 83 raises the pole slightly whereby the skid 25 is lifted clear of the ground.

While the pairs of rollers 82 are thus engaged with the swivel outlet 12, the latter is positively maintained in alignment with longitudinal axis of the carriage.

Figure 13:
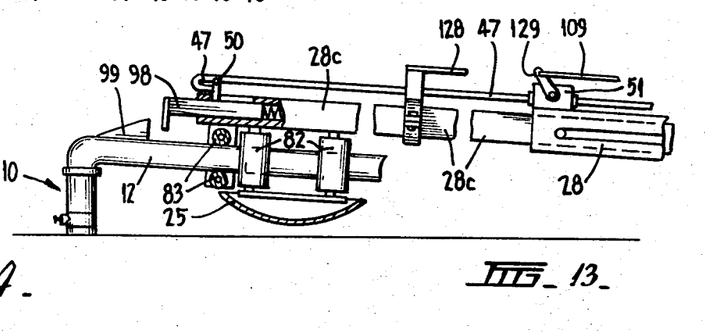
FIG. 13 is a view in side elevation showing the modified control means of FIG. 12.

As the end of the pole moves inwardly along the outlet 12, a spring-loaded depressible plunger 98 thereon strikes an abutment 99 on the outlet. The plunger therefore is arrested as the pole continues to move inwardly and this relative movement opens the aforesaid dump valve 50 for the outer end of the steering cylinder 44. This dump valve may, for example, be a lateral projection on the plunger which is normally resiliently pressed against the open end of the discharge pipe 47 as shown in FIG. 13 which however in other respects shows a modification of the invention.

As at this time the carriage is still being driven inwardly, and as the pivotal connection 40 between the pole and the carriage frame is offset relatively to both wheels, the carriage turns about the axis 40 when the dump valve 50 is opened and this steering movement is assisted by the pressure in the inner end of the steering cylinder 44. In this way, the carriage quickly turns through an angle of approximately 90° at which time the common axis of the transport wheels is approximately radial with respect to the hydrant as shown in FIG. 9.

The carriage at this time therefore is being driven angularly about the axis of the hydrant and the swivel outlet is constrained to turn with it as shown.

In this connection, it will be apparent that if during this angular movement, the pole should move outwardly from the hydrant, the dump valve 50 automatically recloses. If this should occur, the piston in the steering cylinder 44, commences to return towards its normal position so that the transport wheels are swung partly towards the hydrant until the dump valve is again opened. Thus, contact of the plunger 98 with the abutment 99 is automatically maintained until the angular displacement of the carriage is completed.

As this angular movement continues, one arm of a spring-loaded bell crank 100 on the free end portion of the pole engages and displaces an upstanding projection 101 on an escapement actuating arm 102 pivotally mounted at 103 on a plate 104 which is rotatively supported on the hydrant. See FIGS. 5, 6 and 7.

Figure 7:
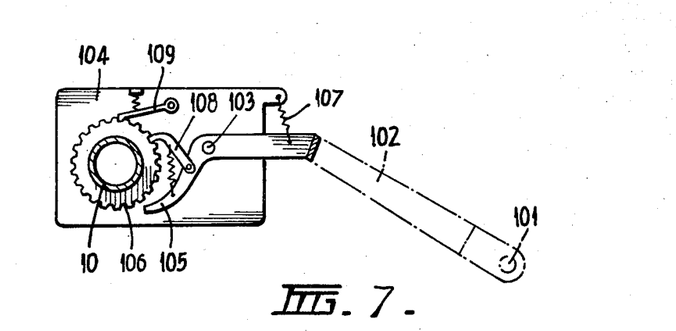
FIG. 7 is a view of sectional plan taken on the line 7—7 of FIG. 5.

The arm 102 has an inward extension 105 constituting a pawl which is normally held clear of the teeth of a ratchet wheel 106 by a spring 107, the ratchet wheel being fixed rigidly to the hydrant. A co-acting pawl 108 is pivoted to the extension 105 and is normally maintained in engagement with the ratchet by a spring, while the plate 104 carries a further spring pressed pawl 109 which prevents retrograde movements of the plate.

Thus, when the aforesaid bell crank 100 on the pole strikes the co-acting projection on the escapement actuating arm 102, the latter is progressively displaced until its pawl extension 105 enters a tooth space and abuts against a tooth to prevent further movement of the arm 102. Consequently, during the further angular movement of the pole 28, the bell crank 100 is turned by engagement with the stationary projection 101 to actuate the reversing mechanism and also to close a further valve 51 in the discharge pipe 47 of the steering cylinder 44.

Thus, the drive to the carriage is reversed while the closing of valve 51 prevents the further discharge of water from the steering cylinder so that due both to the action of the steering cylinder and the outward drive then imparted to the driven wheels, the carriage returns to its normal position relatively to the pole and then continues outwardly along its new travel path. Also, as the carriage moves away from the hydrant, the dump valve 50 automatically recloses.

For the purpose of actuating the reversing mechanism in the aforesaid manner, the other arm of the bell crank is coupled to the reversing arm 64 on the gear box by suitable servo means or, as shown, by a suitable linkage, including link 109 which extends outwardly along the pole from the bell crank. This linkage is devised so that its operation is unaffected by the angular position of the carriage relatively to the pole and for this reason it may extend axially through the pivot pin 40. The last-mentioned operation of the reversing arm 64 also resets the push rod 96 for engagement by the bumper bar, while similarly when the reversing arm is actuated during each outward movement of the carriage, the bell crank 100 is mechanically reset by its linkage and this also restores valve 51 to its normal open position.

From the foregoing description, it will be understood that each time the carriage returns to the hydrant, it is indexed about the latter through an angle which is determined by the escapement mechanism.

The angle through which the carriage is indexed about the hydrant on returning thereto, may depend upon the shape of the area to be irrigated. Thus, for example, the hydrant may be arranged near the center of an elongated rectangular area of relatively narrow width.

For this purpose, the aforesaid rotary spray device 22 may be replaced by a spray boom which is fixed rigidly to the frame of the carriage so as to extend laterally from the opposite sides thereof and which is sufficiently long to cover the full width of the area. The carriage therefore is required only to travel from the hydrant to one end of the field and then after returning to the hydrant to index through an angle of 180° in order similarly to irrigate the opposite end of the area after which the carriage may be again indexed through 180° before commencing a further cycle of operations.

It will be apparent that for this purpose, the carriage would preferably travel at a constant speed in each direction so that the aforesaid variable speed gearing would not be required. It will also be evident that the field may be more or less of boomerang shape so that its opposite end portions are not disposed in co-axial alignment in which case the carriage after returning from one end of the field, would index through an angle of less than 180° to align with the other end portion thereof while on returning from the latter it would index through more than 180° to align with the first-mentioned end.

Thus, the said apparatus may readily be adapted to suit different irrigating requirements.

PROGRAMMED REVERSING CONTROL MECHANISM

In some cases, it is advantageous to control the apparatus so that it automatically reverses at various distances from the hydrant according to the particular direction in which it is travelling. These different distances may depend upon the shape or topography of the field or it may be convenient to divide a very large field into say rectangular sections to be irrigated separately from a hydrant located at the center of each section.

Figure 14:
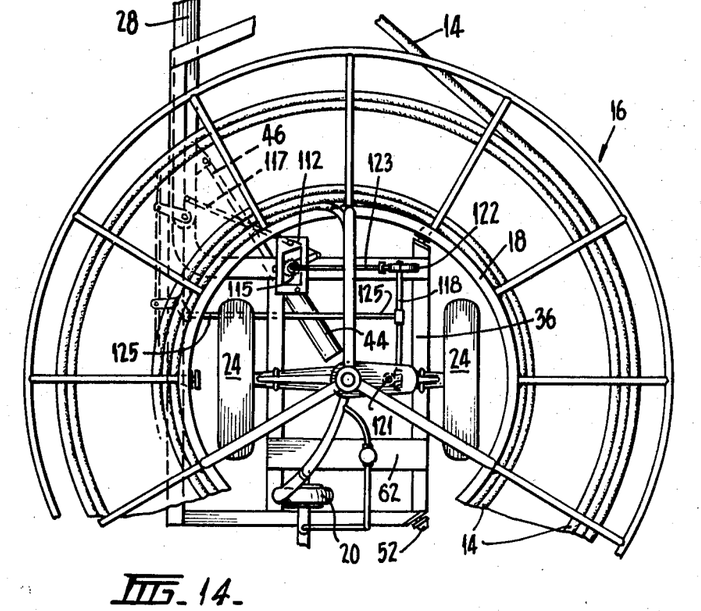
FIG. 14 is a plan view of a part of the carriage and shows programmed control means for reversing the carriage.
Figure 15:
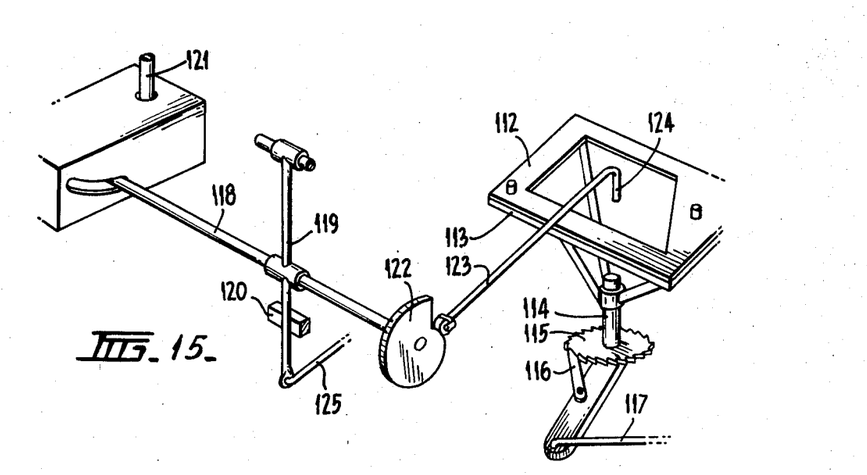
FIG. 15 is a diagrammatic perspective view of the control means shown in FIG. 14, and FIGS. 16 to 19 are diagrammatic plan views showing modified forms of hose carriages according to the invention.

For this purpose and as shown in FIGS. 14 and 15, a replaceable template 112 may be mounted on an intermittently rotatable support 113 carried by the main frame and conveniently arranged within the central opening of the turntable.

The template is formed with a central opening which is a small scale replica of the shape of the field or of the area to be watered.

As shown, the support is mounted on the upper end of a vertical spindle 114 fitted with a ratchet wheel 115 having the same number of teeth as the ratchet wheel 106 of the escapement means on the hydrant and which determines the angle between successive paths of travel of the carriage.

The ratchet wheel 115 is engaged by a driving pawl 116 which is coupled by means, including a pivoted link 117, to the adjacent portion of the pole 28. Thus, each time the carriage returns to the hydrant and pivots towards the pole, the ratchet wheel 115, together with the template 112 is turned through the same angle as the carriage undergoes as it indexes about the hydrant.

Consequently, the template is maintained at a fixed orientation, relatively to the field, irrespective of the changing directions of travel of the carriage.

Arranged adjacent to the template is a horizontal spindle 118 which extends through a bearing carried by a vertical arm 119 which has its upper end pivotally mounted on the frame of the carriage, and a lower part of this arm is normally maintained in contact with a fixed stop 120 by a spring.

One end of the spindle 118 is connected by gearing to a vertical drive spindle 121 which in turn is connected by reduction gearing to the turntable 18, whereby as the carriage travels its maximum distance from the hydrant, the spindle 118 makes not more than one complete revolution.

The driven end of the spindle 118 is also supported so that the spindle may turn about a vertical axis.

The opposite free end of the spindle 118 is fitted with a spiral cam 112 arranged in line with the axis of the template and a roller on the adjacent end of a horizontal push rod 123 is maintained in contact with the cam by a spring, not shown.

The opposite end of the push rod is formed with a depending stop 124 which projects downwards into the aforesaid opening in the template and the position of the outer end of this stop corresponds to the position of the carriage in the field.

For this purpose, the spiral cam 122 is so designed that the motion which it imparts to the push rod is at all times proportional to the speed of the carriage and when the latter returns to the hydrant, the outer face of the stop 124 on the push rod is disposed at or close to the center of the template opening, if the hydrant is arranged at the corresponding position in the field.

Consequently, irrespective of the orientation of the carriage in the field, the template is correspondingly oriented on the carriage so that as the latter moves outwardly from the hydrant in any direction, the stop 124 moves at a proportional speed towards the corresponding part of the template profile.

Thus, as the carriage closely approaches the predetermined limit of its travel in any direction, the stop 124 abuts against the corresponding part of the template so that its motion is arrested.

Consequently, during its further rotation, the cam 122, together with the adjacent end of its spindle 118, is pushed outwardly thus moving the pivoted arm 119 away from the stop 120.

The free lower end of the arm 119 is connected by linkage 125 to the reverse gear arm 64 which therefore is operated consequent upon the engagement of the push rod stop with the template.

MODIFIED CARRIAGE ORIENTING MEANS

The carriage upon returning to the hydrant may be re-oriented without the aid of the aforesaid escapement or other like means though it is preferred to use such means when accuracy in the angular spacing of successive travel paths is necessary or desirable.

Figure 12:
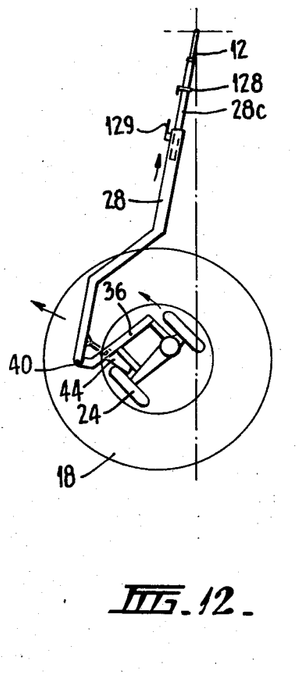
FIG. 12 is a similar diagrammatic plan view illustrating modified means for controlling re-orientation and reversal of the carriage at the hydrant.

One manner of indexing without escapement means is indicated in FIGS. 12 and 13.

In this apparatus, the pole 28 is provided with a telescopic extension 28c which is normally maintained in its fully projected position by a spring. A projection 128 adjustably secured to this extension is arranged to actuate a pivoted arm 129 on the adjacent end of the pole, when the extension is pushed inwards to a sufficient extent and the movement required for this purpose may be regulated by adjusting the position of the projection 128 on the extension.

A normally projected spring pressed plunger 98 is slidably mounted in the free inner end of the extension and carries a lateral projection which constitutes or actuates the aforesaid dump valve 50. As diagrammatically shown in FIG. 13, this projection forms the valve member and is normally resiliently pressed against the adjacent open end of the discharge pipe 47 from the outer end of the steering cylinder 44.

When the carriage returns to the hydrant and homes onto the swivel outlet 12 in the manner previously described, the projecting free end of the plunger 130 is arrested by engagement with a stop shoulder 99 on the outlet member. Thus, during the continued inward movement of the pole, the dump valve is opened to cause the carriage to be steered angularly about the hydrant.

In this case however, the carriage swings through less than a right angle so that as the carriage is driven angularly about the hydrant, it progressively moves closer to the hydrant.

This causes the free end of the telescopic extension 28c of the pole, which is then engaging the shoulder 132, to be progressively forced backwards into the pole. This inward movement continues until the adjustable projection 128 on the extension engages and displaces the arm 129 to actuate the reverse mechanism and also to close the further valve 51 in the discharge pipe 47. This prevents a further discharge of water from the steering cylinder though the dump valve 50 is still open. This valve 51 is automatically reopened consequent upon the reversal of the carriage at the outer end of each travel path as previously explained.

Thus, the carriage is driven in the opposite direction so that it initially swings back to its normal position relatively to the pole and then continues outwardly in its new radial path, it being evident that the angle between this path and the preceding path is dependent upon the location of the adjustable projection 128 on the telescopic extension.

It will be apparent therefore that while this form of apparatus serves to re-orient the carriage about the hydrant, the angle between adjacent radial paths is not positively determined as is the case when the aforesaid escapement means is used.

MODIFIED CARRIAGE CONSTRUCTIONS

Figures 16, 17, 18, 19:
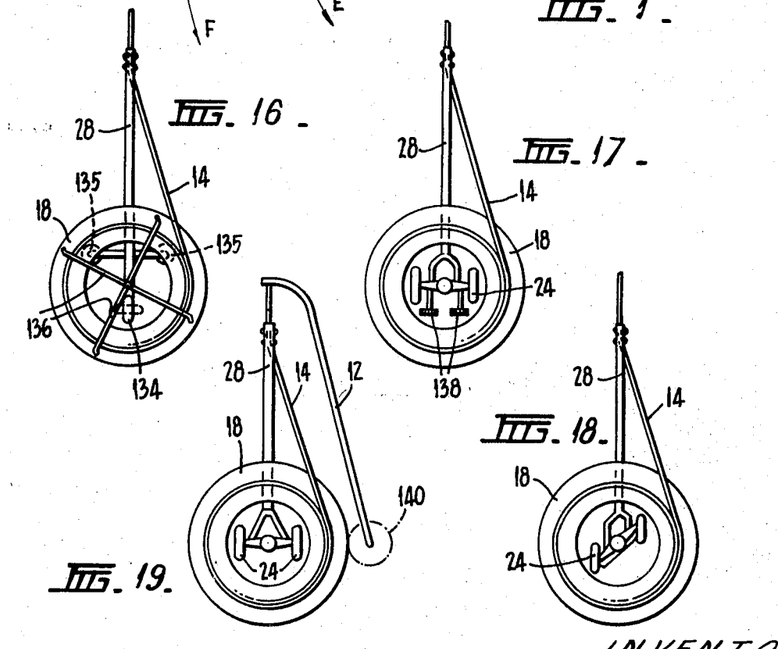

The carriage of the modified apparatus shown in FIG. 16 is supported by a single transport wheel 134 arranged on the longitudinal center line of the carriage and by two laterally spaced skids 135 arranged inwardly of the wheel to provide with the latter, a three-point suspension.

The transport wheel is driven in a constant direction by two rotatable spray arms 136 which are driven in opposite directions by jet reaction.

The transport wheel is mounted on a sub-frame which is pivotally connected to the main frame about a vertical axis which preferably passes through the point of contact between the wheel and the ground. The direction of movement of the carriage is reversed by turning the sub-frame through an angle of 180° while its angular displacement about the hydrant is effected by turning the sub-frame through an angle of 90°.

The carriage of the apparatus shown in FIG. 17 is normally supported and driven by the transport wheels 24 but in this case, the carriage frame is rigidly fixed to the pole 28 and the axis of the said wheels is always disposed at right angles to the radius from the hydrant.

Steering is effected by two laterally spaced auxiliary transport wheels 138 which may be driven continuously while the apparatus is in use. These auxiliary wheels are movably supported on the carriage frame so that they may be raised and lowered and they are normally disposed in their raised positions in which they are clear of the ground.

When the carriage returns to the hydrant and the pole 28 homes onto the swivel outlet 12, means are operated to cause the auxiliary wheels to be forced downwards relatively to the frame until it is raised sufficiently to lift the wheels 24 clear of the ground. Thus, while the carriage is supported by the driven auxiliary wheels 138 it is moved angularly about the hydrant into its next travel line which may be determined by escapement means of the aforesaid kind. At this time, the auxiliary wheels are raised to their normal positions and the carriage is driven outwardly by the wheels 24.

In the further modification shown in FIG. 18, the carriage is supported by two driven transport wheels 24 which are spaced on opposite sides of the longitudinal centerline, and the one in advance of the other. Each wheel is independently pivotally supported for steering movements but are constrained to move in unison by a steering linkage similarly to the steered wheels of an automobile.

When the carriage returns to the hydrant, the steering mechanism is automatically operated to cause the carriage to move angularly about the hydrant into its next travel path. Upon completing this movement which again may be controlled by escapement mechanism, the direction of drive is reversed, the wheels 24 are returned to their normal positions and the carriage commences a further outward movement.

Due to their oblique disposition, the wheels 24 provide a stable support for the carriage when it is moving angularly about the hydrant as well as when it is moving radially.

Finally, in the construction shown in FIG. 19, the swivel outlet arm 12 is elongated and is not aligned with the carriage path except near its free end which is bent at the requisite angle for this purpose. Thus, in this case, the travel path of the carriage does not intersect the hydrant.

When the carriage pole homes onto this bent free end of the outlet arm, the common axis of the transport wheels of the carriage is disposed radially with respect to the hydrant. Thus, during its continued inward movement the carriage pushes the arm 12 ahead of it so that the carriage turns through the required angle which is determined by escapement means operated by the arm 12.

If desired, a circular guide ring indicated at 140 may be arranged about the hydrant for engagement by the inner side of the turntable as the carriage is moving angularly.

I claim:

1. Irrigating apparatus comprising a carriage adapted to be driven outwardly over the ground in an approximately radial path from a fixed hydrant and then to return thereto along substantially the same path, said carriage comprising a frame, at least one driven transport wheel, a driving motor therefor, spray means arranged to discharge, onto the ground, water supplied thereto from the hydrant through a flexible hose, rotary winding and unwinding means from which the hose is progressively paid out and laid on the ground as the carriage moves outwardly, and which progressively rewinds the hose as the carriage moves inwardly, means operable to reverse the direction of movement of the carriage, means operable, as the carriage is moving outwardly to actuate said reversing means whereby the carriage is caused to return inwardly, means engageable with the hydrant when the carriage returns thereto, thereby to cause the carriage to be displaced angularly about the hydrant and means subsequently operable to again actuate said reversing means, whereby the carriage commences a further outward movement in a different travel path.

2. Irrigating apparatus according to claim 1 wherein said means operable to actuate said reversing means as the carriage is moving outwards, comprises displaceable bumper means arranged at the outward end of the carriage so as to be displaceable by an obstruction in its path of movement.

3. Irrigating apparatus according to claim 1 wherein said means operable to actuate said reversing means, as the carriage is moving outwards, comprises means responsive to the movement of the carriage to a predetermined distance from the hydrant.

4. Irrigating apparatus according to claim 1 including the said fixed hydrant, a swivel outlet on the hydrant to which the adjacent end of the hose is connected, and means on the inner end portion of the carriage adapted to engage the swivel outlet whereby the latter is constrained to move in unison with the carriage as the latter is angularly displaced about the hydrant into said different travel path.

5. Irrigating apparatus according to claim 4 including escapement means operable as the carriage is being angularly displaced about the hydrant to determine the extent of such angular displacement.

6. Irrigating apparatus according to claim 4 including a telescopically retractible member on the inner end portion of the carriage, resilient means normally maintaining said retractible member in its fully projected position, and abutment means on the hydrant for engagement by said retractible member as the carriage closely approaches the limit of its inward movement whereby, during the further inward movement of the carriage, said retractible member is progressively displaced, and wherein said means operable to actuate said reversing means to cause the carriage to commence a further outward movement, is operable by said retractible member when the latter is displaced to a predetermined position.

7. Irrigating apparatus according to claim 1 wherein said driven transport wheel is steerable thereby to enable the carriage to be driven angularly about the hydrant into said different travel path, and including steering means operable to impart steering movements to said wheel, and wherein said steering means is operable by said means engageable with the hydrant when the carriage returns thereto, thereby to cause the carriage to be angularly displaced.

8. Irrigating apparatus according to claim 4, including an elongated, substantially counterbalanced, inward extension on the carriage, and wherein said means on the carriage for engaging the swivel outlet comprises hose guide means on the free inner end portion of the said extension.

9. Irrigating apparatus according to claim 1 having two driven transport wheels, arranged co-axially in spaced relationship and non-steerably mounted on the frame, differential gearing for transmitting motion to said wheels from the motor, an elongated, substantially counterbalanced inward extension on the carriage, means pivotally connecting the outward end of the extension to the frame about a vertical axis which is laterally offset relatively to both of said wheels, and steering means operable to cause said frame to move angularly with respect to said extension, and wherein said steering means is operable by said means engageable with the hydrant when the carriage returns thereto.

10. Irrigating apparatus according to claim 4 having two driven transport wheels arranged co-axially in spaced relationship and non-steerably mounted on the frame, differential gearing for transmitting motion to said wheels from the motor, an elongated substantially counterbalanced, inward extension rigidly connected to the frame, and wherein said swivel outlet on the hydrant comprises an elongated arm which is angularly displaced relatively to and ahead of the travel path, for the time being, of the carriage, said outlet arm having a free outer end portion arranged at an angle to the inward portion thereof whereby said outer end portion is disposed in alignment with said travel path for engagement by the free inner end portion of said inward extension on the frame, escapement means interconnecting said swivel outlet arm to the fixed body of the hydrant thereby to limit the angular movement of the outlet arm at each actuation thereof, and wherein when the carriage returns to the hydrant, the axis of said driven wheels is disposed substantially radially with respect to the hydrant, whereby during the continued inward movement of the carriage, the latter, together with the swivel outlet arm, is moved angularly about the pivotal axis of the outlet arm to the extent permitted by said escapement means.

11. Irrigating apparatus according to claim 1 wherein said rotary winding and unwinding means for the hose is a horizontal turntable on which the hose is wound as a single-layer spiral coil.

12. Irrigating apparatus according to claim 4 including escapement means on the hydrant, said escapement means being adapted to limit the angular displacement of the carriage and of the swivel outlet about the hydrant when the carriage returns thereto, a small scale template of the area to be irrigated, means rotatively supporting the template on the carriage, means operable, when the carriage returns to the hydrant, to turn the template through the same angle as that through which the carriage is angularly displaced, whereby the template is maintained at a constant orientation relatively to the area to be irrigated, a movable abutment member operatively associated with the template, means operable to move said abutment member at a speed proportional to the carriage speed whereby the abutment member at all times occupies, relatively to the template, a position which corresponds to the position of the carriage in the area being watered, and wherein said member abuts against the template when the carriage has moved outwardly to a predetermined limiting distance from the hydrant for the direction in which it is then moving, and means operable, consequent upon such engagement of the abutment member with the template, to actuate said reversing means.

13. Irrigating apparatus according to claim 1 including variable speed means operable to progressively increase the speed of movement of the carriage as it is returning to the hydrant whereby the discharged water is substantially uniformly distributed on the ground, and means responsive to the distance of the carriage from the hydrant for controlling said variable speed means.

14. Irrigating apparatus according to claim 13, wherein said means responsive to the distance of the carriage from the hydrant is also operable as the carriage is moving outwardly thereby to cause its speed of movement to be progressively reduced.

15. Irrigating apparatus according to claim 1 wherein said driving motor is a hydraulic motor and including means whereby water, supplied to the carriage through the hose, is directed to the motor before it passes to said spray means, and wherein said reversing means comprises reverse gearing through which motion is transmitted from the motor to propel the carriage.

16. Irrigating apparatus according to claim 15 including means forming a by-pass passage which communicates at one end with the inlet to the motor and which communicates at the other end thereof, with the discharge from the motor, a valve in the by-pass passage to regulate the amount of water which by-passes the motor, thereby to control the speed of the latter, and means responsive to the distance of the carriage from the hydrant to regulate the by-pass valve so as progressively to reduce the speed of the carriage as it moves outwardly and vice versa.

17. Irrigating apparatus according to claim 1 including an elongated inward extension connected to the frame, hose engaging means on the free inner portion of said extension, said hose engaging means being adapted to maintain the hose under tension as it is laid on the ground while the carriage is moving outwards, and also to guide the carriage along the hose as the carriage is moving inwards, and wherein the center of gravity of the carriage is disposed at a low level and close to said transport wheel whereby the said elongated extension is substantially counterbalanced.

18. Irrigating apparatus according to claim 17, having two driven transport wheels arranged co-axially in laterally spaced relationship, said transport wheels being non-steerably mounted on the frame, differential gearing through which motion is transmitted to said wheels from the driving motor, and means pivotally connecting said extension to the frame about a vertical axis which is offset laterally relatively to both of said wheels, whereby the frame may move angularly with respect to the extension to cause the carriage to move angularly about the hydrant, and steering means connecting said frame to the extension to impart relative angular movements thereto, and wherein said steering means is controlled by said means engageable with the hydrant when the carriage returns thereto.

19. Irrigating apparatus according to claim 17 wherein said inward extension is rigidly connected to the frame and including, two driven transport wheels arranged in laterally spaced relationship, means pivotally mounting said wheels on the frame whereby steering movements may be imparted thereto, differential gearing through which motion is transmitted to the wheels from the driving motor, and steering means operable to impart steering movements to said wheels when the carriage returns to and engages the hydrant.

* * * * *